July 26, 1955     F. LUIPERSBEK     2,713,753
FLOWER POTS
Filed April 14, 1954
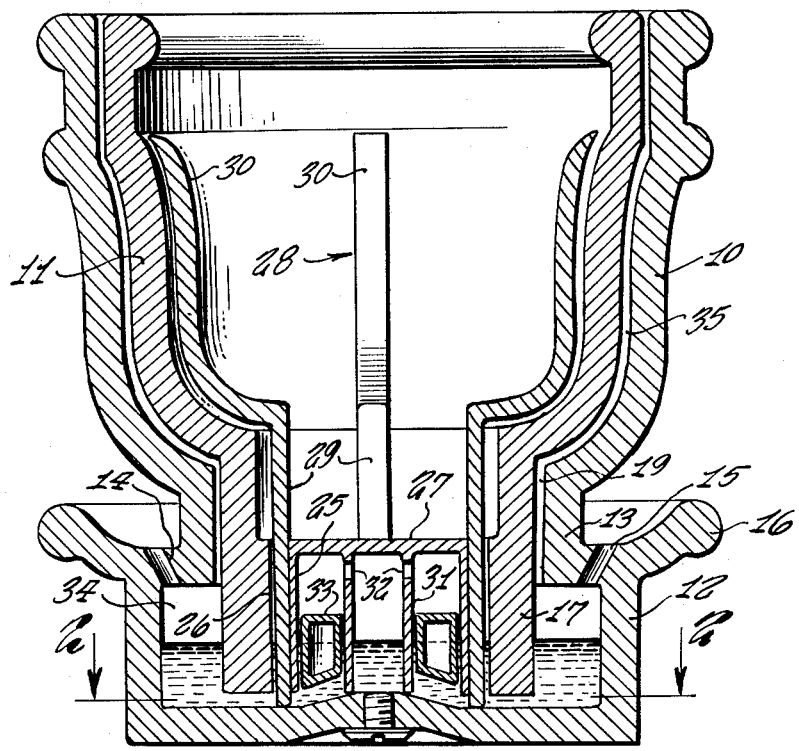
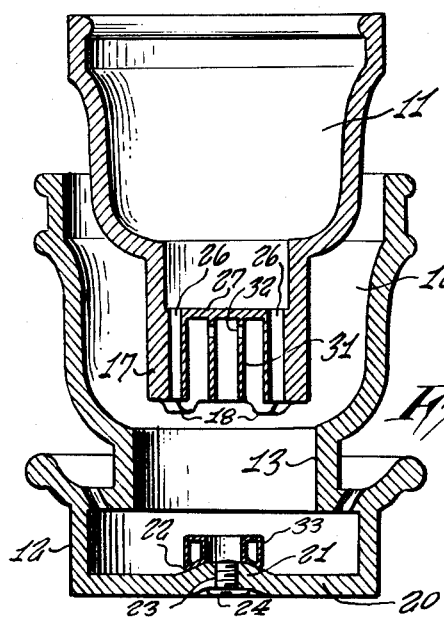
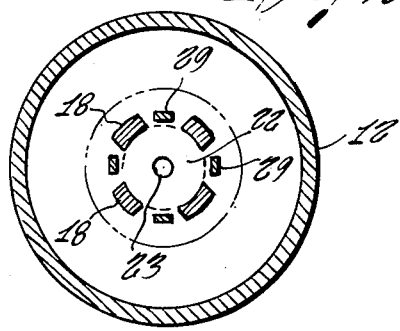
INVENTOR
FRANK LUIPERSBEK
J. Ledermann
ATTORNEY

United States Patent Office 2,713,753  
Patented July 26, 1955

2,713,753
FLOWER POTS
Frank Luipersbek, Bronx, N. Y.

Application April 14, 1954, Serial No. 423,161

2 Claims. (Cl. 47—38)

This invention relates to flower pots, and the main object is the provision of certain new and useful improvements maintaining the soil and plant and their immediate environment suitably moistened and damp without requiring constant attention to the pot.

The above broad as well as additional and more specific objects will be clarified in the following description wherein characters of reference refer to like-numbered parts in the accompanying drawing. It is to be noted that the drawing is intended solely for the purpose of illustration and that it is therefore neither desired nor intended to limit the invention necessarily to any or all of the exact details of construction shown except insofar as they may be deemed essential to the invention.

Referring briefly to the drawing,

Fig. 1 is a longitudinal vertical sectional view through the axis of a flower pot embodying the features of the present invention.

Fig. 2 is a sectional view taken on the line 2—2 of Fig. 1.

Fig. 3 is a view similar to Fig. 1 but with parts omitted and with the inner member shown posed above its position of registration within the outer member.

Referring in details to the drawing, the numeral 10 indicates the outer bowl-like member and the numeral 11 the inner bowl-like and complementary member, these together constituting the upper portion of the pot. A hollow cylindrical base 12 supports and is integral with the outer bowl 10, through the medium of a reduced neck 13 and an annular roof 14 which is provided with spaced angular passages 15, as well as a concave eave 16.

The bowl 11 has a depending cylindrical sleeve 17 provided with spaced feet 18, this sleeve being adapted to register loosely, with a circumferential space 19 around it, within the neck 13, with the feet resting on the floor 20 of the base 12. The center portion 21 of the floor is raised, as a boss, and the circumferential surface of the boss is beveled or conical, as shown at 22. An axial threaded opening 23 is provided through the boss, which may be closed by a plug 24 or, when open, may have a hose or pipe nipple, not shown, connected thereto.

The sleeve 17 has the lower portion thereof considerably thickened, as shown at 25, internally, and a roof 27 is provided on the said thickened lower end of the sleeve. A plurality, such as four, for example, of vertical passages 26, spaced a quadrant apart, are provided through the wall 25 of the lower portion of the sleeve, and they extend also through the top or roof 27. Each of four separate members 28 is adapted to be loosely supported within the bowl 11 by having its lower portion formed into a straight leg 29 registering loosely in a hole or passage 26. The upper portion is of substantially the same cross-sectional dimensions as the leg 29 but its shape follows the internal contour of the bowl, substantially as shown. The leg 29 positioned in its passage 26 maintains the upper shaped portion 30 spaced inward from the surface of the bowl 11, substantially as shown.

An axial vertical tube 31 extends integrally downward from the roof 27 and its lower end, when the sleeve 17 rests on the floor 20, snugly engages the conical surface of the boss 21. If desired, a gasket, not shown, may be provided between the conical surface 22 and the lower end of the tube. Radial openings 32 are provided through the tube at a common horizontal level near the upper end thereof.

An annular float 33 surrounds the tube and is adapted to ride up and down thereon. Assuming that a hose or pipe is attached to the opening 23 and water is able to trickle therefrom into the tube 31, after rising sufficiently the water will pass through the openings 32 into the float chamber. It is to be noted that the float has a conical lower edge complemenary to the conical surface 22 of the boss, so that in its lowermost position the float rests flush against the boss. Water entering the float chamber will raise the float and will also pass under the sleeve 17 into the annular well 34 in the base, as well as under the vertical passages 26. When the float is raised sufficiently it will cut off the flow through the passages 32.

With soil and, of course, a plant in the bowl 11 above the roof 27, moisture will be drawn upward by capillary action from below through the space between the legs 29 and the passages 26 in which they register loosely as said space is normally partly filled with a porous mass of loose or unpacked particles of soil which dropped or trickled from above, and vapor will rise through the circumferential space 19, 35, between the inner and outer members 10 and 11. Also, moisture will pass in the form of vapor through the passages 15. Consequently, not only the soil will be constantly maintained damp within the pot, but the immediate environment of the plant and pot will also be maintained humid. The pot may also be used where a connection with the opening 23 is not practical, leaving the plug 24 in to seal the opening, by entering water on the eave 16 and letting it pass through the openings 15 until the level in the well 34 has risen as far as its maximum. Then the water thus supplied will serve to maintain the soil and plant properly for a considerable length of time.

The loose registration of the legs 29 in the passages 26 not only provides a relatively narorw space around the legs for capillary action to be effective, but owing to their looseness the legs are subject to very slight lateral movement from time to time by disturbance of the pot or the plant and thus they tend to prevent complete clogging of the space around the legs by soil particles falling from above and getting packed tight therein.

Obviously, modifications in form or structure may be made without departing from the spirit or scope of the invention.

I claim:

1. A flower pot comprising an outer member and an inner member, said outer member comprising a bowl-like upper portion and a hollow substantially cylindrical base portion including an annular concave approximately horizontal roof at the top and a bottom wall at the bottom, a reduced cylindrical neck portion joining said annular roof with the lower rim of said upper portion, said annular roof extending radially beyond the periphery of said base portion thereby providing a circumferential eave around said base portion, said annular roof having a plurality of openings therethrough, said inner member comprising an insert consisting of an upper portion substantially complementary to said bowl-like portion and a reduced hollow cylindrical portion passing downward through said neck and having spaced feet on the lower rim thereof, said reduced cylindrical portion having said feet thereof resting on said bottom wall thereby supporting said inner member within and spaced from said outer member, said cylindrical portion of said inner member having a horizontal partition substantially intermediate its height and having the lower portion of the wall thereof below the partition thickened in a radially inward direction, vertical passages extending through said thickened wall and said partition, said base portion being adapted to hold water, passage of said water between said base portion and the interior of said cylindrical portion of the inner member under said partition being provided between said feet, said partition having a tube extending axially downward therefrom to substantially the level of the lower rim of said cylindrical portion, said tube having at least one opening therethrough near the upper end thereof, an annular float slidably mounted on said tube, said bottom wall having an axial passage therethrough in alignment with said tube and adapted to have a water supply connected thereto, the horizontal level of said tube opening being positioned not higher than the level of said roof, said float rising to close said tube opening when the level of water in said base portion reaches a level not higher than the level of said roof and falling to open said tube opening upon descent of the float to a level below said tube opening, said bottom wall having a conical boss extending upward therefrom coaxial with said axial passage therethrough, the lower end of said tube resting on said conical boss.

2. A flower pot according to claim 1, the lower surface of said float being complementarily conical with respect to said boss.

References Cited in the file of this patent

UNITED STATES PATENTS

| 1,231,976 | Weitzel, 2nd | July 3, 1917 |
| 1,633,184 | Luipersbek | June 21, 1927 |
| 2,072,185 | Schein | Mar. 2, 1937 |
| 2,638,716 | Luipersbek | May 19, 1953 |

FOREIGN PATENTS

| 128,494 | Germany | Feb. 25, 1902 |
| 577,276 | France | June 2, 1924 |